United States Patent [19]

Sato et al.

[11] Patent Number: 4,661,879
[45] Date of Patent: Apr. 28, 1987

[54] OVERCURRENT PROTECTION CIRCUIT FOR LINE CIRCUITS IN A SWITCHING SYSTEM

[75] Inventors: Kazuhiro Sato; Hiroyoshi Mori, both of Yokohama, Japan

[73] Assignee: Fujitsu Limited, Kanagawa, Japan

[21] Appl. No.: 750,164

[22] Filed: Jun. 28, 1985

[30] Foreign Application Priority Data

Jul. 5, 1984 [JP] Japan ............... 59-137966
Jul. 6, 1984 [JP] Japan ............... 59-140921
Jul. 6, 1984 [JP] Japan ............... 59-140922

[51] Int. Cl.⁴ ............................................ H02H 9/02
[52] U.S. Cl. .................................... 361/58; 361/94; 361/98; 361/101
[58] Field of Search ............... 361/58, 94, 98, 101, 361/111, 117, 118, 119, 18; 323/279, 901, 902

[56] References Cited

U.S. PATENT DOCUMENTS

| | | | |
|---|---|---|---|
| 3,403,320 | 9/1968 | Whitman, Jr. | 323/901 |
| 3,534,249 | 7/1967 | Neill et al. | 323/279 |
| 3,755,679 | 8/1973 | Otsuka | 323/902 |
| 4,307,440 | 12/1981 | Inove et al. | 323/901 |
| 4,528,608 | 7/1985 | Anderson et al. | 361/58 |

FOREIGN PATENT DOCUMENTS 0883884 11/1981 U.S.S.R. ............... 323/901

OTHER PUBLICATIONS

*Motorola, Zener Diode/Rectifier Handbook*, Motorola Inc., Second Edition, pp. 36–39.
"Jitsuyo Denshi Kairo Handobukku" (Handbook of Practical Electronic Circuits), pp. 377 and 378 (especially Figs. 6-19, 6-20, and 6-21), Sept. 30, 1972, CQ Shuppan Kabushiki Kaisha pub., Tokyo, Japan.

*Primary Examiner*—A. D. Pellinen
*Assistant Examiner*—Jeffrey A. Gaffin
*Attorney, Agent, or Firm*—Staas & Halsey

[57] ABSTRACT

An overcurrent protection circuit including a first transistor, a second transistor, and an integrator. The first transistor operates to control a current flow from a power source to a load. The second transistor is turned on when an overcurrent flows through the first transistor. The overcurrent is detected by watching the collector-emitter voltage of the first transistor. Thus, the second transistor operates to bypass the base current to be supplied to the first transistor with a certain delay time defined by a delay part, which enables an instantaneous overcurrent to be ignored.

23 Claims, 15 Drawing Figures

OVERCURRENT PROTECTION CIRCUIT FOR LINE CIRCUITS IN A SWITCHING SYSTEM

BACKGROUND OF THE INVENTION

1. Field of the Invention

The present invention relates to an overcurrent protection circuit. More particularly, it relates to an overcurrent protection circuit which can be introduced into a battery feed circuit for line circuits in a switching system.

As is well known, an overcurrent protection circuit protects a circuit from abnormally large currents, for example, a load current flowing through the circuit abnormally larger than a rated current therefor. The most typical means for protecting a circuit from abnormally large current is a fuse. A fuse is blown by large currents due to, for example, short-circuits, thereby protecting the circuit from damage. Various other types of overcurrent protection circuits have been proposed and put into practical use.

2. Description of the Related Art

Overcurrent protection circuits can be basically classified into two types: fusible types and semiconductor types. An overcurrent protection circuit of the latter type, i.e., the semiconductor type, is fabricated with transistors. Known transistor-type overcurrent protection circuits offer dual protection against large currents, first by limiting the current and second by breaking the current.

However, there are problems in prior art overcurrent protection circuits. Transistor-type circuits inevitably consume power and it is difficult to fabricate compact transistor type circuits inexpensively since they must withstand the heat caused by short-circuits. Fusible type circuits must be replaced each time a short-circuit occurs. This means that many fuses must be stocked. Further, a window must be provided to allow determination of the fuse state. Furthermore, the overall design of the equipment must be such as to allow easy replacement of fuses.

SUMMARY OF THE INVENTION

An object of the present invention is to provide an improved overcurrent protection circuit substantially free of the problems of the prior art.

To attain the above object, the overcurrent protection circuit according to the present invention basically includes a first transistor, a second transistor, and a delay part. The first transistor operates to control a current flow form a power source to a load. The second transistor is turned on in response to a collector-emitter voltage $V_{CE}$ of the first transistor and thereby turns the first transistor off. The delay part operates to turn on the second transistor after a predetermined delay time.

BRIEF DESCRIPTION OF THE DRAWINGS

The above object and features of the present invention will be more apparent from the following description and the preferred embodiments with reference to the accompanying drawings, wherein.

DESCRIPTION OF THE PREFERRED EMBODIMENTS

Before describing the embodiments of the present invention, the prior art and the problems therein will be first described with reference to the related figures. For easy comprehension, the following explanations will be primarily made by taking as an example an overcurrent protection circuit used in a telephone exchange system.

As is well known, a fuse is inserted into a line in series therewith. On the other hand, known transistor type overcurrent protection circuits are as follows.

Figure 1:
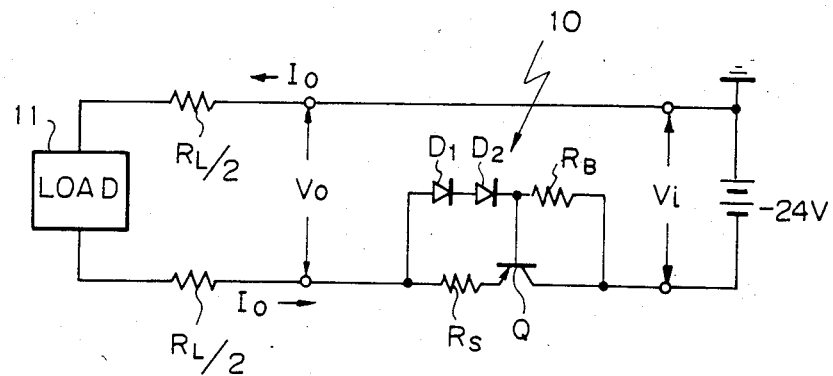
FIG. 1 is a circuit diagram of one example of a prior art overcurrent protection circuit of a current limiting type.

FIG. 1 is a circuit diagram of an example of a prior art overcurrent protection circuit of the current limiting type. The overcurrent protection circuit 10 of the figure is used as, for example, a protector for a battery feed circuit in a switching system. In the drawings, reference numeral 11 represents a load such as telephone terminal equipment, $R_L$ a resistance of a subscriber line, $V_i$ an input voltage, and $V_o$ an output voltage.

The overcurrent protection circuit 10 comprises, as illustrated, a transistor Q, diodes $D_1$ and $D_2$, and resistors $R_B$ and $R_S$, and operates, when a load current $I_o$ exceeds a predetermined threshold value, to limit the load current $I_o$ at a constant level.

Figure 2:
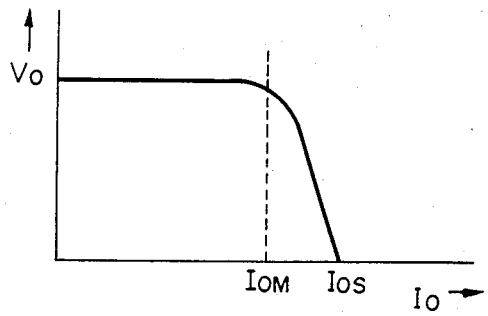
FIG. 2 is a graph depicting a relationship between a load current $I_o$ and an output voltage $V_o$ of the overcurrent protection circuit of FIG. 1.

FIG. 2 is a graph depicting a relationship between the load current $I_o$ and the output voltage $V_o$ of the overcurrent protection circuit of FIG. 1. As will be noted from the graph, when the load current value exceeds a predetermined threshold value $I_{OM}$ due to a short-circuit, for example, the load current thereover is suppressed below than a constant value $I_{OS}$.

Figure 3:
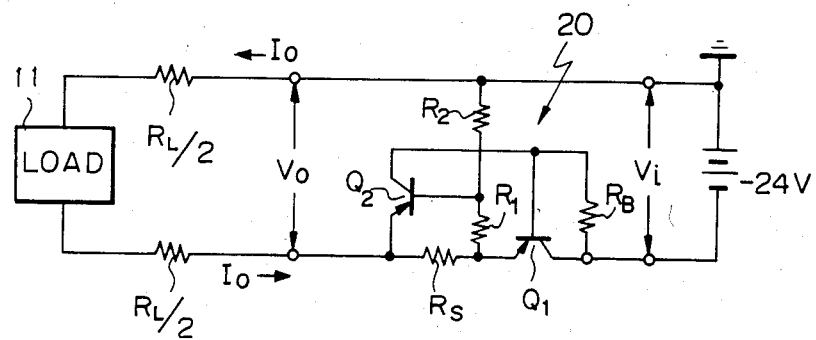
FIG. 3 is a circuit diagram of another example of a prior art overcurrent protection circuit of a current limiting type.

FIG. 3 is a circuit diagram of another example of a prior art overcurrent protection circuit of a current limiting type. The overcurrent protection circuit 20 is known as a "holdback" type. This type of overcurrent protection circuit 20 comprises of two transistors $Q_1$ and $Q_2$ and four resistors $R_1$, $R_2$, $R_S$ and $R_B$ and operates, when the load current $I_o$ exceeds a predetermined value, to reduce the load current $I_o$.

Figure 4:
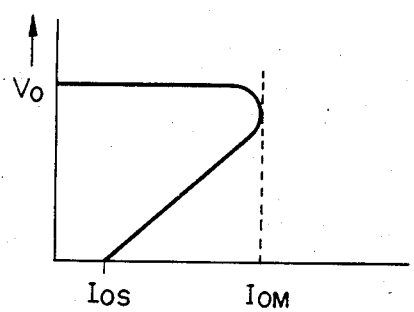
FIG. 4 is a graph depicting a relationship between a load current $I_o$ and an output voltage $V_o$ of the overcurrent protection circuit of FIG. 3.

FIG. 4 is a graph depicting a relationship between the load current $I_o$ and the output voltage $V_o$ of the overcurrent protection circuit of FIG. 3. As will be noted from the graph, once the load current value reaches a predetermined threshold value $I_{OM}$, the load current is pulled down to a constant value $I_{OS}$ which is lower than the value $I_{OM}$.

Figure 5:
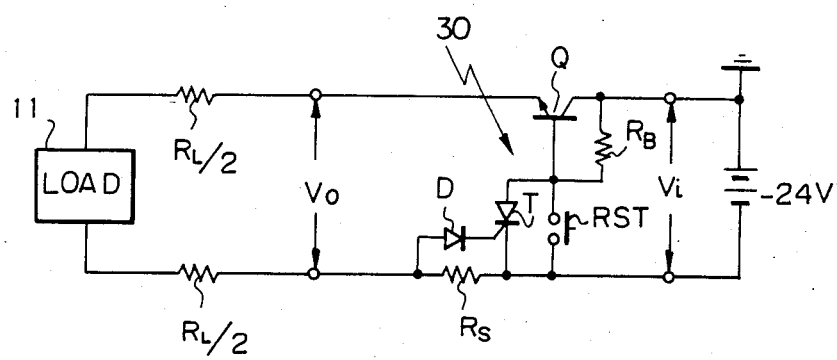
FIG. 5 is a circuit diagram of one example of a prior art overcurrent protection circuit of a current breaking type.

FIG. 5 is a circuit diagram of one example of a prior art overcurrent protection circuit of a current breaking type. The overcurrent protection circuit 30 of this type includes, as illustrated, a transistor Q, a thyristor T, a diode D, resistors $R_B$ and $R_S$, and a reset switch RST, and operates to first to turn on the thyristor T by an overcurrent due to, for example, a short-circuit, and then to turn off the transistor Q, whereby the overcurrent is broken at the transistor Q. The thus broken load current can be released by placing the reset switch RST on to turn off the thyristor T and, accordingly, turn on the transistor Q again.

As briefly mentioned before, there are problems in the prior art overcurrent protection circuits. Regarding the insertion power loss, the overcurrent protection circuits 10 and 20 shown in FIGS. 1 and 3 both consume power since the transistor Q and the resistor $R_S$ are inserted into and in series with the line for carrying the load current. This insertion power loss reduces the efficiency of the battery feed in a battery feed circuit. To be specific, assuming that the collector-emitter voltage ($V_{CE}$) of the transistor Q is 0.2 V, the base-emitter voltage ($V_{BE}$) thereof is 0.6 V, the load current carried thereby is 100 mA, and the voltage, detected when an overcurrent occurs, across the resistor R connected in series with the line is 0.8 V, the insertion power loss concerned becomes 160 (=1.6 V×100 mA) mW. The above-mentioned insertion power loss due to the insertion of the overcurrent protection circuit (10, 20) thereinto is equivalent to lengthening the subscriber line by 57 m, assuming that the resistor having the resistance value $R_L$ of the subscriber line is 0.28 Ω/m, which is given from the equation:

$$\frac{1.6 \text{ V}}{0.1 \text{ A} \times 0.28 \text{ }\Omega/m} = 57 \text{ m}$$

It should be recognized that effective lengthening of the line, or the shortening of the maximum line length, by 57 m means a considerably large economic loss. A length of 57 m is not negligible relative to the maximum length of 500 m of a subscriber line in an usual private branch exchange (PBX).

The above-mentioned insertion power loss is also inevitable in the overcurrent protection circuit 30 shown in FIG. 5.

The problems in the prior art can be solved by the overcurrent protection circuit according to the present invention, which comprises a first transistor operative to control a current flow from a power source to a load; a second transistor operative to be turned on in response to a collector-emitter voltage ($V_{CE}$) of the first transistor; and a delay part operative to receive the collector-emitter voltage ($V_{CE}$), create a delay time relative to the change thereof, and turn on the second transistor after the thus created delay time.

Figure 6:
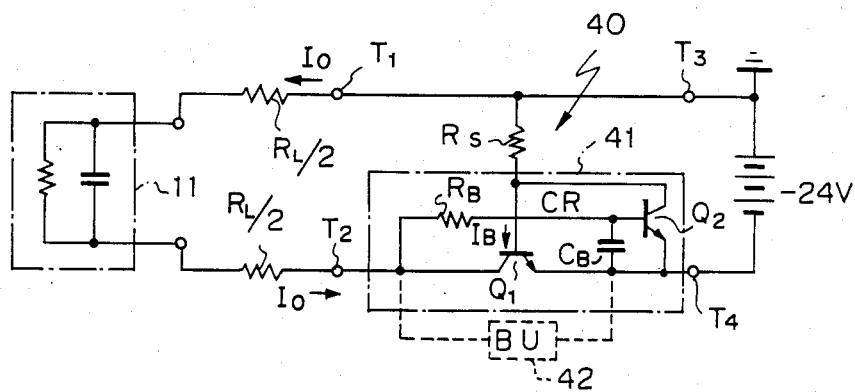
FIG. 6 is a circuit diagram of an overcurrent protection circuit according to a basic embodiment of the present invention.

FIG. 6 is a circuit diagram of an overcurrent protection circuit according to a basic embodiment of the present invention. In FIG. 6, the resistor having the resistance value $R_L$ of the subscriber line and also the load 11 (illustrated in the form of an equivalent circuit representing the aforesaid telephone terminal equipment) are explained above. The overcurrent protection circuit 40 of the basic embodiment is constructed, as its major part, with an overcurrent limiting part 41. The part 41 is preferably provided with a backup (BU) part 42, shown by broken lines in the figure. The backup part 42 cooperates with the overcurrent limiting part 41 so as to back up the operation thereof (mentioned in detail hereinafter).

The overcurrent limiting part 41 comprises a first transistor $Q_1$, a second transistor $Q_2$, and a delay part. The first transistor $Q_1$ operates to control a flow of a load current $I_o$ supplied from a power source to the load 11. The power source is illustrated in the figures as a battery of −24 V. The second transistor $Q_2$ operates to be turned on in response to a change in a collector-emitter voltage ($V_{CE}$) of the first transistor $Q_1$. The delay part operates, in general, to create a delay time relative to the change of the collector-emitter voltage ($V_{CE}$) and turn on the second transistor $Q_2$. To be more specific, the delay part can be set up in the form of an integrator which integrates the voltage ($V_{CE}$). The integrator can be constructed by various types of circuits, such as a so-called CR integrator or an integrator utilizing an operational amplifier. According to the basic embodiment, the integrator is fabricated, as the CR type, with a capacitor $C_B$ and a resistor $R_B$. The integrator CR ($C_B$ and $R_B$) produces an output to be applied to the second transistor $Q_2$ at its base. The collector of the second transistor $Q_2$ is connected with the base of the first transistor $Q_1$, and operates to pass the related base current directly to the emitter of the second transmitter $Q_2$. That is, the second transistor $Q_2$ functions to remove the base current $I_B$ to be inherently supplied, via a resistor $R_S$, to the first transistor $Q_1$ at its base.

The base current $I_B$ is selected so as to operate the first transistor $Q_1$ sufficiently in a saturation region during its normal operation. In short, a suitable resistor $R_S$ is selected first. During operation of the first transistor $Q_1$ in the saturation region, the collector-emitter voltage $V_{CE(SAT)}$, i.e., a saturation voltage between the collector and emitter thereof, varies in a range of about 0.1 V to 0.4 V. For such a low voltage values of $V_{CE(SAT)}$, the second transistor $Q_2$ cannot be turned on. In this case, the power loss at the first transistor $Q_1$ is small.

However, in the event of a short-circuit occurring at the side of the load 11, viewed from, for example, terminals $T_1$ and $T_2$, an overcurrent flows to the subscriber line, which overcurrent greatly exceeds a usual load current in magnitude. When the first transistor Q₁ carries such an overcurrent, it works not in the above-mentioned saturation region, but in an active region. In the active region, the voltage $V_{CE}$ of the first transistor Q₁ increases proportionally along with the increase of the overcurrent. For example, when the overcurrent is I₁ or I₂ (I₁<I₂), the voltage $V_{CE}$ is increased by an incremental voltage $\Delta V_{CE1}$ or $\Delta V_{CE2}$ ($\Delta V_{CE1}<\Delta V_{CE2}$), respectively. This being so, the voltage level $V_{CE(SAT)}+\Delta V_{CE1}$ (or $V_{CE(SAT)}+\Delta V_{CE2}$) exceeds the base-emitter voltage $V_{BE(Q2)}$ of the second transistor Q₂, and thus the second transistor Q₂ is turned from off to on. Once the second transistor Q₂ is changed even slightly into its on-state, the base current $I_B$ to be given to the first transistor Q₁ is partially bypassed to the second transistor Q₂. Therefore, the base current $I_B$ to be given to the transistor Q₁ is slightly reduced.

The slight reduction of the current $I_B$ then causes a further increment in the voltage $V_{CE}$ of the transistor Q₁. The larger the voltage $V_{CE}$ of the transistor Q₁, the deeper the transistor Q₂ enters into its on state and, on the other hand, the smaller the current $I_B$ for the transistor Q₁. The reduction in the current $I_B$ makes the $V_{CE}$ of the transistor Q₁ larger, whereby the transistor Q₂ is brought completely into the on state. As a result, the supply of the current $I_B$ is broken completely. Consequently, the overcurrent can be sufficiently suppressed and reaches substantially zero.

As recognized from the above, the turning off of the transistor Q₁ and the turning on of the transistor Q₂ are controlled in a positive feedback relation. Accordingly, the overcurrent can be broken without error. In this case, the change in the transistor Q₂ from the off to on state and the change in the transistor Q₁ from the on to off state are both completed in a very short time. Therefore, the first transistor Q₁ is left in the active region a very short time. This means that, although an excessive current flows through the first transistor Q₁ (the excessive current being lower in magnitude than a current given by, in the transistor Q₁, $\beta \times I_B$, where $\beta$ denotes a DC current gain), the first transistor Q₁ is not required to have a severe heat withstanding characteristic, since the time in which the excessive current flows is very short. In other words, the first transistor Q₁ does not have to be of a high cost type.

Further, once the second transistor Q₂ is turned on (while the transistor Q₁ is turned off), the transistor Q₂ maintains the on state as it is. This is because the transistor Q₂ cannot switch to its off state by itself. That is, once an overcurrent occurs, the transistor Q₁ is held off (i.e. cut-off region) and, at the same time, the transistor Q₂ is held on (i.e., saturation region), so long as no external control for the release is effected thereto. Therefore, any heat generation therein during a short-circuit is very small. Accordingly, the related overcurrent protection circuit can be made small in size, which is preferable from an economical viewpoint.

In the event of a short-circuit, the overcurrent protection circuit is kept in a braking state. One benefit of the present invention, is that the overcurrent protection circuit thus kept in the braking state can easily and simply be returned to the normal state merely by momentarily unplugging the load 11 having the short-circuit so that the base current is stopped from being supplied to the second transistor Q₂ and so that the transistors Q₁ and Q₂ are automatically restored to their initial states. Therefore, when the faulty load 11 is replaced with a normal one, the transistors Q₁ and Q₂ will restart the usual current supply with overcurrent protection.

Referring again to the integrator CR in the overcurrent limiting part 41, the integrator CR can simulate the characteristic of a usual fuse. As well known, a fuse generally does not respond to momentary overcurrents. In other words, a fuse does not blow even if any overcurrent exceeding a predetermined magnitude flows so long as it only flows within a certain time duration. This characteristic of ordinary fuses is very advantageous for overcurrent protection, particularly in a battery feed circuit of a telephone switching system.

In FIG. 6, the block bound by the terminals T₁, T₂, T₃, and T₄ forms a part of line circuits in a telephone switching system. When new telephone terminals (loads 11) are incorporated into the switching system, new line circuit packages for the same are plugged in these terminals T₁ through T₄. Each plug-in causes a rush current, which is generated to initially charge capacitive components, such as an equivalent capacitor contained in each load 11, stray capacities, and the like. This rush current usually reaches several times the usual load current in magnitude, however the rush current does not flow continually, as does the usual load current, but momentarily.

It will be noted that the aforesaid integrator CR is useful in that it can disregard such a rush current selectively, i.e., the integrator CR is not responsive to the rush current.

The integrator CR is also useful when a momentary overcurrent flows even when a maintenance worker erroneously and momentarily touches, with a tool, terminals of a main distribution frame (MDF). In this case, the overcurrent protection circuit of the present invention should preferably not respond to such a momentary overcurrent. It should respond selectively only to continual overcurrent, such as a current due to a short-circuit, and selectively break such a continual overcurrent with the aid of the integrator CR. Further, a time constant ($\tau$) can freely be determined to suitably set a time for turning on the second transistor Q₂. The time constant ($\tau$) is defined, as known, by the capacitance value of the capacitor $C_B$ and/or the resistance value of the resistor $R_B$.

Figure 7:
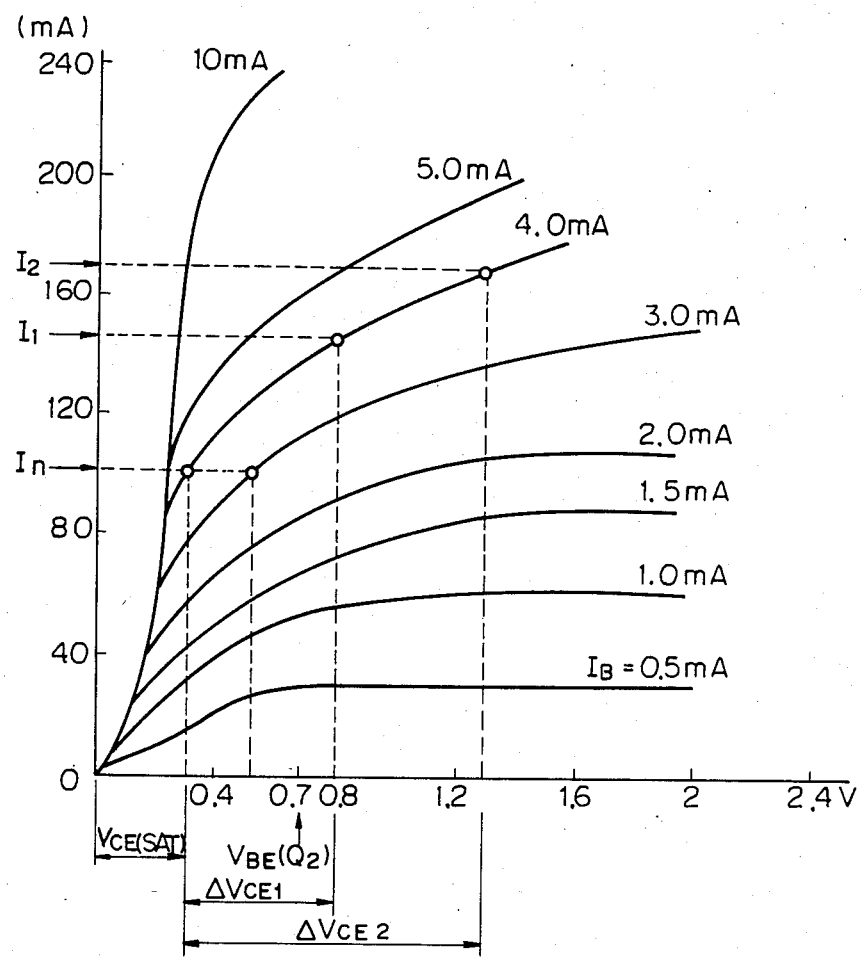
FIG. 7 is a graph of the voltage-current characteristics of the overcurrent protection circuit shown in FIG. 6.

FIG. 7 is a graph of the voltage-current characteristics of the overcurrent limiting part 41 shown in FIG. 6. The graph is a convenient, illustration of, the relationship of the overcurrents I₁, I₂, the collector-emitter voltage $V_{CE(SAT)}$, the related incremental voltages $\Delta V_{CE1}$, $\Delta V_{CE2}$, the base-emitter voltage $V_{BE(Q2)}$ of the second transistor Q₂, and the base current $I_B$ of the first transistor Q₁, which were mentioned with respect to the brief explanation of the operation of the overcurrent limiting part 41. The character $I_n$ in FIG. 7 denotes a rated current of the limiting part 41.

The operation of the overcurrent limiting part 41 will be explained in more detail. The total resistance value $R_r$ can be expressed by the inequality (1), in which $R_r$ is the resistance value at the side of the load 11, viewed from the terminal T₁ and T₂ (shown in FIG. 6), and the overcurrent limiting part 41 can detect and break an overcurrent with a value of $R_r$ satisfying inequality (1).

$$\frac{E - V_{CE(SAT)} - V_{BE(Q2)}}{\beta \times I_B} > R_r \geqq 0 \qquad (1)$$

Wherein the characters $V_{CE(SAT)}$, $V_{BE(Q2)}$, $I_B$, and $\beta$ have already been explained, while E denotes a power source voltage, i.e., the absolute value of $-24$ V shown in FIG. 6.

In the event of a short-circuit, a delay time $T_{off}$ is approximated by the following expression (2), which delay time $T_{off}$ is defined as the time from the occurrence of the short-circuit concerned to breakage of the overcurrent:

$$T_{off} \approx -\tau l_n \left(1 - \frac{\Delta V_{BE(Q2)}}{\Delta V_{CE(Q1)}}\right) \text{ (sec)} \quad (2)$$

wherein, the time constant $\tau$, $V_{CE(Q1)}$, and $\Delta V_{BE(Q2)}$ are respectively defined by the following expressions (3), (4), and (5).

$$\tau = R_B \times C_B \quad (3)$$

$$\Delta V_{CE(Q1)} = E - V_{CE(SAT)} - (\beta \times I_B \times R_r) \quad (4)$$

$$\Delta V_{BE(Q2)} = V_{BE(Q2)} - V_{CE(SAT)} \quad (5)$$

Substituting the following specific values into the expressions (E=24 V, $V_{CE(SAT)}$=0.2 V, $V_{BE(Q2)}$=0.7 V, $\beta$=210, $I_B$=1.2 mA, $R_B$=200 KΩ and $C_B$=10 μF), the resistance value $R_r(\Omega)$ is obtained, from the above recited inequality (1), to be in a range of:

$$91 > R_r \geq 0 \quad (6)$$

and the delay time $T_{off}$(sec) is obtained, from the above recited expression (2), to be:

$$T_{off} \approx (200 \times 10^3 \times 10 \times 10^{-6}) \times \quad (7)$$

$$l_n \left(1 - \frac{0.7 - 0.2}{24 - 0.2 - (210 \times 1.2 \times 10^{-3} \times R_r)}\right)$$

$$= -2 \times l_n \left(1 - \frac{0.5}{23.8 - 0.25 R_r}\right)$$

Figure 8:
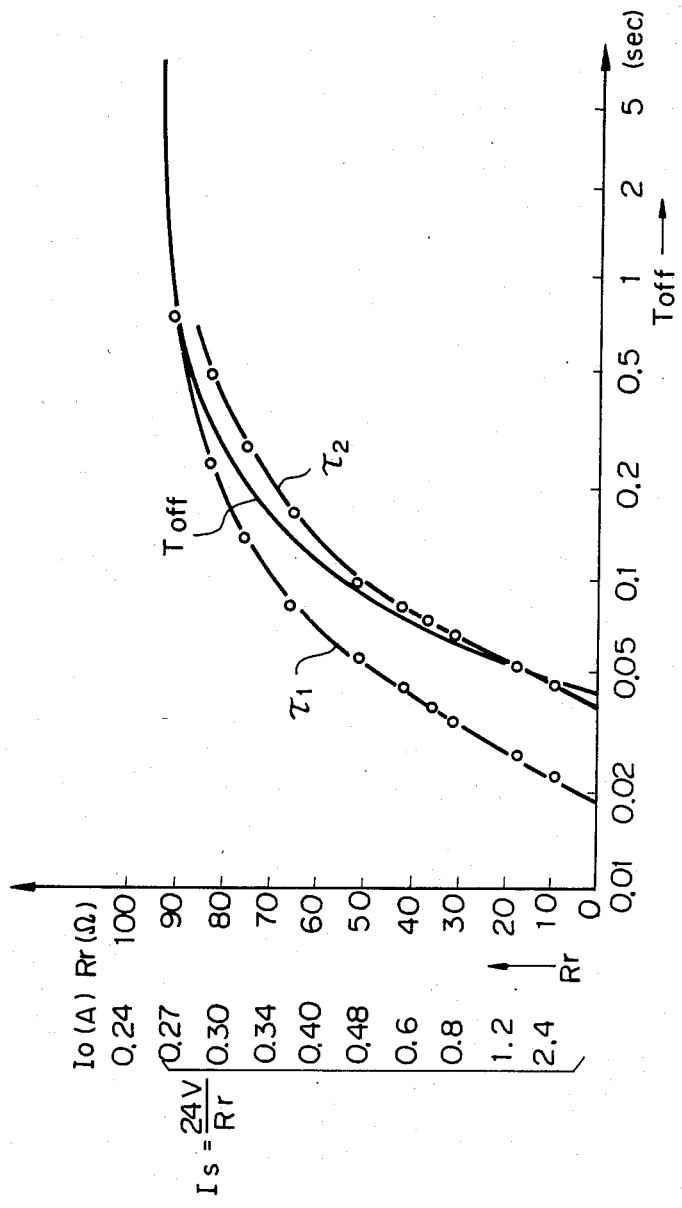
FIG. 8 is a graph of the breaking characteristics produced by the overcurrent protection circuit according to the present invention.

FIG. 8 is a graph of the breaking characteristics produced by the overcurrent protection circuit according to the present invention. The abscissa of the graph indicates the time delay $T_{off}$ on a logarithmic scale, and the ordinate indicates both the total resistance value $R_r$ and the load current $I_o$, separately. It should be noted here that the character $I_s$ indicates a virtual current representing the total resistance value $R_r$ which is transformed into a current value. As understood from the graph, the time required for breaking the overcurrent is made longer or shorter by an increase or decrease of the overcurrent, respectively, and therefore, this characteristic resembles that of a fuse. Note here that, in the graph, the curve $T_{off}$ represents a curve obtained from the above recited expression (2), wherein the time constant $\tau$ is preset as 2 sec. Further, the curves $\tau 1$ and $\tau 2$ are obtained by plotting actual measured data, where the time constants are preset as $\tau=1$ sec and $\tau=2$ sec, respectively.

Referring again to FIG. 6, the backup part 42 functions to perform operations which are not peformed by the overcurrent limiting part 41 itself. The specific operation or operations to be performed being suitably determined according to a desired use of the overcurrent protection circuit, as exemplified by the following application, which embodiments are based on the basic embodiment (FIG. 6). Although each of the application embodiments will be explained independently, combinations of these are, of course, possible.

Figure 9:
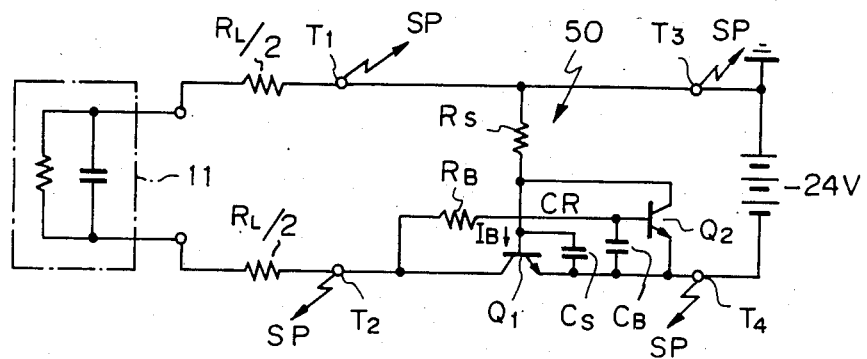
FIG. 9 is a circuit diagram of an overcurrent protection circuit having a backup part according to a first application embodiment of the present invention.

FIG. 9 is a circuit diagram of an overcurrent protection circuit having a backup part according to a first application embodiment of the present invention. It should be noted that, throughout the drawings, identical members are represented by the identical reference numerals or symbols. An overcurrent protection circuit 50 has a backup part according to the first application embodiment, which is simply fabricated with a capacitor $C_S$ which cooperates with resistor $R_S$. The capacitor $C_S$ is inserted, as illustrated, between the base and emitter of the first transistor $Q_1$.

As mentioned previously, when new loads are to be installed, new corresponding line circuit packages are plugged in at the terminals $T_1$ through $T_4$. In this case, a problem is caused by sparks SP, each schematically illustrated by jagged arrows in the FIG. 9. The sparks SP are produced due to the plug-in of the line circuit package at the terminals $T_1$ through $T_4$. The sparks SP not only give deleterious noise to the adjacent line circuit package under operation and thereby induce malfunctions therein, but also damage the terminals $T_1$ through $T_4$ by their heat. The reason for the generation of the sparks SP is that, at the moment of the plug-in, an excessive rush current flows so as to charge the capacitors in the load 11 and along the subscriber line, as stray capacitance. Usually, each line circuit package incorporates a plurality of line circuits, for example, eight line circuits, integrally. Therefore, the sparks SP generated at the terminals $T_1$ through $T_4$ become very strong.

In view of the above, the backup part ($C_s$) of the first application embodiment operates to inhibit such a rush current therethrough when the related line circuit package is plugged in at the terminals $T_1$ through $T_4$. To be specific, at the initial stage where the plug-in operation is a performed, the first transistor $Q_1$ is turned off, but thereafter it is turned on. The reason for this delayed turn-on operation is that the sparks SPs are only generated with such an excessive rush current during the plug-in operation. To achieve the delay the capacitor $C_S$ functions to momentarily absorb the base current $I_B$ to be supplied to the first transistor $Q_1$ just after the plug-in operation. That is, the first transistor $Q_1$ cannot be turned on until a predetermined delay time elapses, which delay time is determined by a time constant defined by the resistor $R_S$ and the capacitor $C_S$. Thus, a slow-acting transistor $Q_1$ is provided by the use of the capacitor $C_S$, which forms, together with the resistor $R_S$, another integrator having a time constant ($\tau_S$), other than the integrator having the time constant ($\tau_B$). In this case, attention should be paid in determining the two time constants $\tau_B(=C_B \times R_B)$ and $\tau_S(=C_S \times R_S)$ to satisfy the relationship $\tau_S < \tau_B$. If $\tau_S$ is preset to be larger than $\tau_B$, the inherent function of the integrator would be lost. In actuality, it is preferable to select the values $\tau_B$ and $\tau_S$ to closely satisfy the equation $$\tau_S = \frac{1}{100} \tau_B.$$

An overcurrent protection circuit having a backup part according to a second application embodiment of the present invention will be described below. The overcurrent protection circuit of the second application embodiment further incorporates a status detector. The status detector operates to indicate whether the overcurrent protection circuit is in an braking state ("off" state) or in a feeding state ("on" state). The status detector basically includes a first light emission device which is connected in series with the collector of the second transistor $Q_2$ and is energized when the transistor $Q_2$ is conductive, which light emission indicates the braking state of the overcurrent protection circuit.

Figure 10:
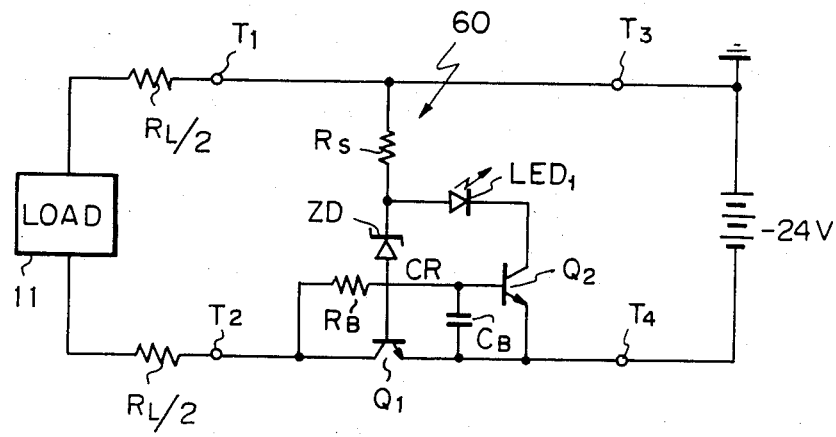
FIG. 10 is a circuit diagram of an overcurrent protection circuit having a first type of backup part according to a second application embodiment of the present invention.

FIG. 10 is a circuit diagram of an overcurrent protection circuit having a first type of backup part according to the second application embodiment of the present invention. In FIG. 10, the aforesaid first light emitting device is a light emission diode ($LED_1$). When the $LED_1$ is lit, the light indicates the "off" state, i.e., braking state, of an overcurrent protection circuit 60. If the overcurrent protection circuit is fabricated with a conventional fuse, the "off" or "on" state can be discriminated by merely observing the fuse itself externally, wherein the burnt out state of the fuse indicates the "off" state. In the telephone switching system, prompt elimination of trouble therefrom is very important to keep the system normal. For prompt elimination, it is necessary to find the faulty line circuit.

If a fault occurs in the load 11, the second transistor $Q_2$ is kept on ($Q_1$ is kept off). By utilizing this fact, the first light emission device, i.e., the first diode $LED_1$, is connected in series with the collector of the second transistor $Q_2$. This being so, if the overcurrent protection circuit 60 is changed to the "off" state, the diode $LED_1$ is lit and thereby the faulty line can be found immediately by watching the light.

When the diode $LED_1$ is lit, the first transistor $Q_1$ must not be erroneously turned on. This relation can be ensured by canceling the forward voltage of the diode $LED_1$. For this, the diode $LED_1$ preferably cooperates with a Zener diode ZD. The Zener diode ZD is connected in series with the base of the first transistor $Q_1$ and, at the same time, in parallel with the diode $LED_1$.

Figure 11:
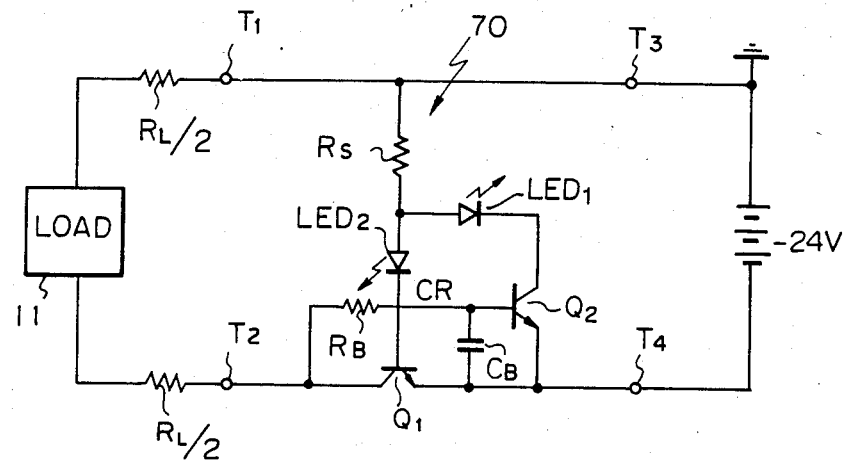
FIG. 11 is a circuit diagram of an overcurrent protection circuit having a second type of backup part according to the second application embodiment of the present invention.

FIG. 11 is a circuit diagram of an overcurrent protection circuit having a second type of backup part according to the second application embodiment of the present invention. In the second type of backup part, the aforesaid status detector further includes a second light emission device which indicates, when lit, the "on" state, i.e., the feeding state, of an overcurrent protection circuit 70. Specifically, in FIG. 11, the second light emission device is made of a second light emitting diode $LED_2$. The diode $LED_2$ also has the same function as that of the Zener diode ZD shown in FIG. 10.

The second diode $LED_2$ is connected in series with the base of the first transistor $Q_1$ and, therefore, energized when the transistor $Q_1$ is conductive during the "on" state, i.e., the working state of the overcurrent protection circuit 70.

Figure 12:
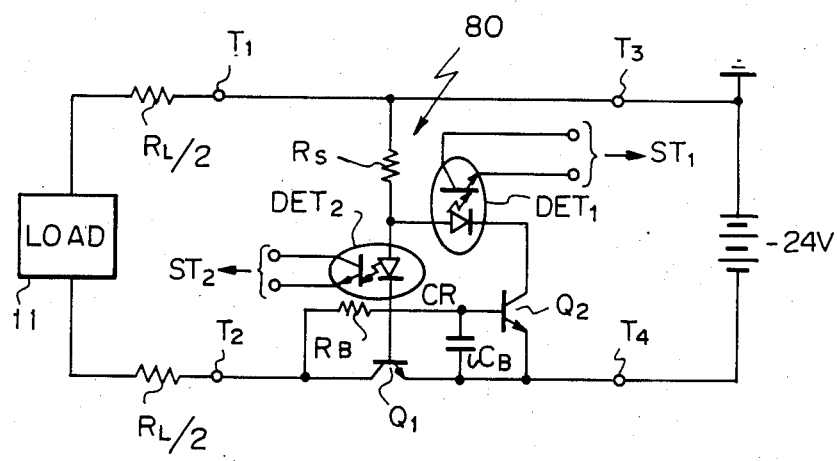
FIG. 12 is a circuit diagram of an overcurrent protection circuit having a third type of backup part according to a second application embodiment of the present invention.

FIG. 12 is a circuit diagram of an overcurrent protection circuit having a third type of backup part according to the second application embodiment of the present invention. The third type of backup part operates to issue a detected status indication signal or signals outside of the confines of an overcurrent protection circuit 80 in response to the aforesaid light emission device or devices. The status indication signal is useful for transferring the "on" and "off" state information to a control unit of the telephone switching system concerned. In FIG. 12, the first light emitting diode ($LED_1$) forms a first detector $DET_1$ which issues a first detected status indication signal $ST_1$. The detector $DET_1$ is set up in the form of a photocoupler and produces the signal $ST_1$ when the overcurrent protection circuit 80 is changed to the "off" state. Similarly, the second light emission diode ($LED_2$) forms a second detector $DET_2$ which issues a second detected status indication signal $ST_2$. The detector $DET_2$ is set up in the form of a photocoupler and produces the signal $ST_2$ when the overcurrent protection circuit 80 is put in the "on" state.

An overcurrent protection circuit having a backup part according to a third application embodiment of the present invention will be described below. The overcurrent protection circuit of the third application embodiment further incorporates a set/reset controller. The set/reset controller operates to set or reset the overcurrent protection circuit. That is, the set/reset controller can make active or nonactive the overcurrent protection circuit. The words "active" and "nonactive" mean to put the overcurrent protection circuit in the "on" or "off" state, i.e., the braking or feeding state, respectively.

Figure 13:
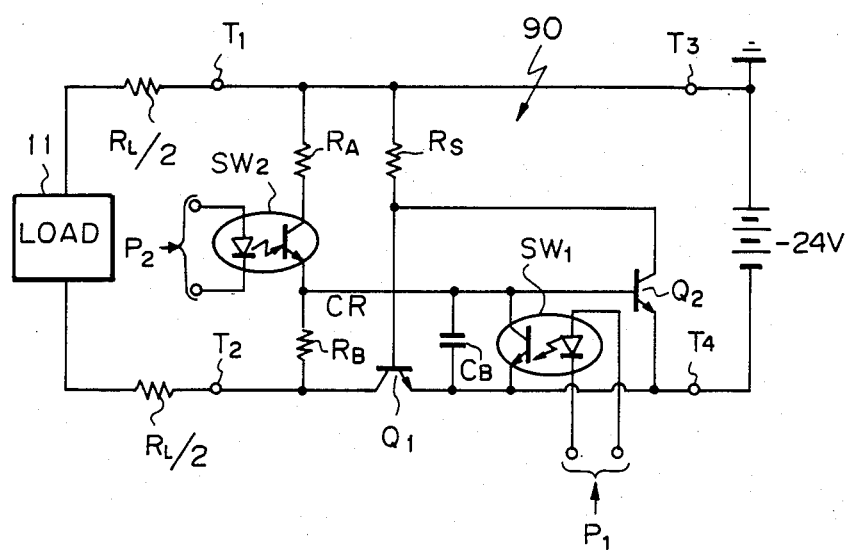
FIG. 13 is a circuit diagram of an overcurrent protection circuit having a first type of backup part according to a third application embodiment of the present invention.

FIG. 13 is a circuit diagram of an overcurrent protection circuit having a first type of backup part according to a third application embodiment of the present invention. The set operation part of the aforesaid set/reset controller includes a first switch $SW_1$. The first switch $SW_1$ operates to bypass a current which has been supplied to the base of the second transistor $Q_2$, so that the transistor $Q_2$ is turned off to place the overcurrent circuit in the "on" state.

On the other hand, the reset operation part of the aforesaid set/reset controller including a second switch $SW_2$. The second switch $SW_2$ operates to supply a current to the base of the second transistor $Q_2$, so that the transistor $Q_2$ is turned on to place the overcurrent protection circuit in the "off" state.

The first and second switches $SW_1$ and $SW_2$ can specifically be made of electronic switches, such as photocouplers, as illustrated.

The overcurrent limiting part 41 (refer to FIG. 6) cannot switch to itself to the feeding state, once the first transistor $Q_1$ is turned off ($Q_2$ is turned on), due to the presence of the previously mentioned positive feedback relation between the turning on and the turning off of the first and second transistors $Q_1$ and $Q_2$, respectively,. When it is required to release the overcurrent protection circuit from the thus kept braking state, according to the previously mentioned method, the load 11 is momentarily unplugged from the subscriber line. However, the overcurrent protection circuit 90 of FIG. 13 needs no such unplugging motion for the load 11, but can be realized by simple control of the switches $SW_1$ and $SW_2$ to turn on or off the first and second transistors $Q_1$ and $Q_2$. This will be clarified by the following explanations.

In a first case, some short-circuit has occurred. Therefore, the second transistor $Q_2$ is now on, while the first transistor $Q_1$ is now off. At this time, a maintenance worker repairs the faulty part concerned. When the faulty part is restored, he restarts the battery feed. In this case, the restart operation is performed, in the circuit of FIG. 13, by externally supplying a first pulse $P_1$ in order to turn the first switch $SW_1$ on. The switch $SW_1$ functions, when on, to break the base current to be given to the second transistor $Q_2$. Thus, the transistor $Q_2$ is turned off. Then, the supply of the base current to the first transistor $Q_1$ restarts due to the turning off of the second transistor $Q_2$. The first transistor $Q_1$ is thus turned on, so that the battery feed can restart, and the battery feed is maintained as is so long as no overcurrent occurs.

Contrary to the above, if the maintenance worker wishes to stop the battery feed, a second pulse $P_2$ is externally supplied to the second switch $SW_2$ to make this on. The switch $SW_2$ functions, when on, second transistor $Q_2$. Accordingly, the base current for the first transistor $Q_1$ is broken to make this off. As a result, the battery feed is stopped, as intended.

Figure 14:
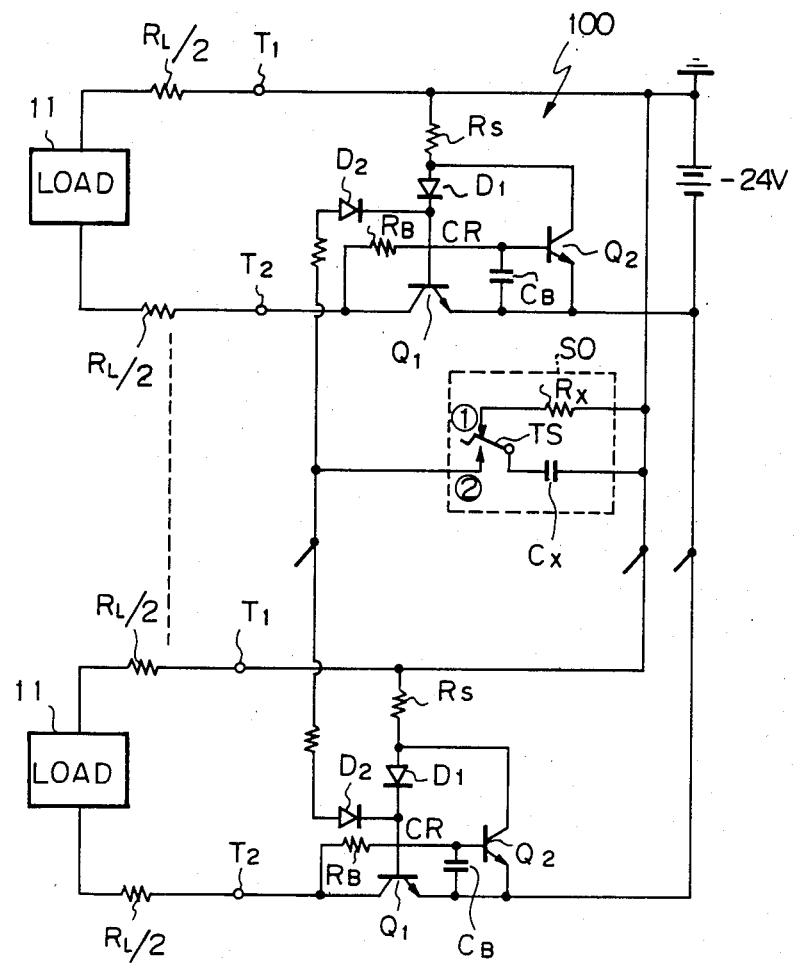
FIG. 14 is a circuit diagram of an overcurrent protection circuit having a second type of backup part according to a third application embodiment of the present invention.

FIG. 14 is a circuit diagram of an overcurrent protection circuit having a second type of backup part according to a third application embodiment of the present invention. The second type of backup part for the third application embodiment utilizes a set/reset controller of a second type, comprising a transfer switch which operates to supply an additional current to the base of the first transistor $Q_1$ to restore the overcurrent protection circuit from the braking state to the feeding state. The overcurrent protection circuit 100 of FIG. 14 is useful for the following reason. As mentioned previously, once a short-circuit occurs and the first transistor $Q_2$ is turned on while the second transistor $Q_1$ is turned off, the setting operation must be performed with a momentary unplugging motion of the load 11 or the overcurrent protection circuit, as a whole, from the line to be protected, once the related short-circuit is removed. During the unplugging and plug-in motion of the overcurrent protection circuit, noise is generated at the plug-in and unplugging portions. The noise grates on the subscriber's ear. Further, such noise is serious in view of line quality, in case the related switching system works as a digital data switching system. That is, the noise concerned induces data errors.

The above-mentioned noise occurring during the unplugging and plug in motion can be greatly suppressed with the use of a transfer switch. The transfer switch is referenced by TS in the set operation part, indicated by broken lines SO of the aforesaid set/reset controller. The transfer switch TS cooperates with both a resistor $R_x$ and a capacitor $C_x$. The resistor $R_x$ and the capacitor $C_x$ are connected in parallel with each other and are connected at the ground line side of the subscriber line. The transfer switch TS assumes a first switch state ① and a second switch state ②. In the first switch state ①, the transfer switch TS functions to discharge the capacitor $C_x$. This corresponds to a usual state. When the set operation is needed, the transfer switch TS is changed to assume the second switch state ②. At this time, a charging current flows from the positive end of the battery (−24 V) to the base of the first transistor $Q_1$ via the capacitor $C_x$, the contact (②) of the switch TS, a resistor, and a diode $D_2$. Thereby, the transistor $Q_1$ is turned on, and the load current flows. In this case, the collector-emitter voltage $V_{CE}$ of the transistor $Q_1$ is substantially zero, and, therefore, the second transistor $Q_2$ is turned off automatically.

The set operation mentioned above can also be realized in a reverse mode. That is, first, the capacitor $C_x$ is precharged through the resistor $R_x$ via the contact (①) of the switch TS, and, then, the thus precharged capacitor $C_x$ functions to turn on the first transistor $Q_1$. In this mode, the right end of the capacitor $C_x$ should not be connected to the ground line, as illustrated, but should be connected to the negative end of the battery (−24 V).

The transfer switch TS does not have to be mounted for each overcurrent protection circuit, but can be mounted commonly for a plurality of overcurrent protection circuits, as illustrated in FIG. 14, from an economical viewpoint. In this case, the additional current given from the transfer switch TS is effective only to one or more overcurrent protection circuits in the braking state. Thus, the remaining working overcurrent protection circuits ignore such an additional current.

The above-mentioned second embodiment (FIGS. 10, 11, and 12) and third embodiment (FIGS. 13 and 14) are useful for a microcomputer controlled system, since the overcurrent protection circuits according to the second and third embodiments can issue "on"/"off" state information outside or receive "on"/"off" commands given from outside, both in the form of electric signals suitable for the microcomputer. This enables automation of maintenance and management and also remote control.

Figure 15:
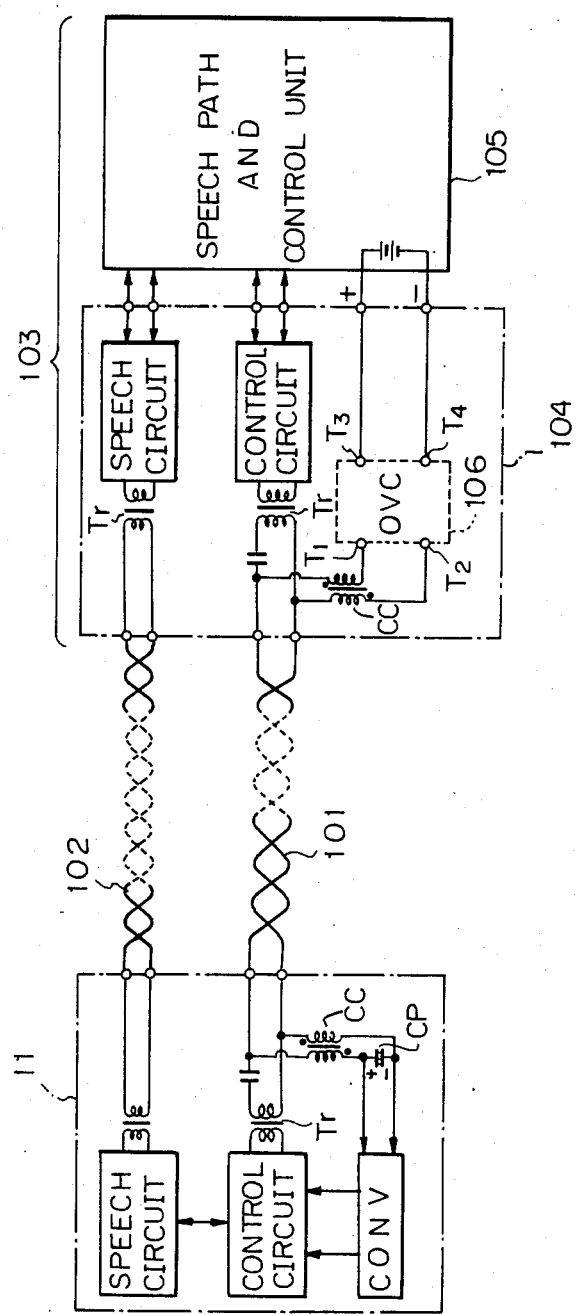
FIG. 15 is one example of a telephone switching system to which the overcurrent protection circuit of the present invention is adapted.

FIG. 15 is one example of a telephone switching system to which the overcurrent protection circuit of the present invention is adapted. Reference numeral 11 represents the aforesaid load, i.e., telephone terminal equipment, specifically, future multiple functions telephones ("future phone"). A line 101, connected to the load 11, corresponds to the line having the aforesaid resistors $R_L$, which works as a battery feed line and a control line, simultaneously. A line 102 works as a speech path line carrying voice and/or data signals. These lines 101 and 102 are connected, at their other ends, to an exchanger 103. The exchanger 103 contains therein at least an interface card 104 and a speech path and control unit. The overcurrent protection circuit OVC (referenced before as 40, 50, 60, 70, 80, 90, and 100) of the present invention is accommodated, as a block 106, in the interface card 104, by way of the terminals $T_1$ through $T_4$.

A choke coil CC and a capacitor CP in the load 12 form a low-pass filter which connects with a DC/DC converter (CONV). The converter receives power of 24 V and converts it to 5 V power, which is suitable for the speech circuit, the control circuit and so on, usually made of complementary metal-oxide semiconductor integrated circuits (CMOS/IC), in the figure, each character $T_r$ denotes a transformer for impedance matching.

As explained above in detail, according to the present invention, the base current of the first transistor, operative to control the flow of the load current, is bypassed to turn on the second transistor, which is operative to cut off the first transistor, with the use of the output voltage produced from the integrator.

Accordingly, the second transistor operates to be turned on with a delay time defined by the time constant of the integrator. Therefore, the second transistor can be turned on with no malfunctions even in a change of the load current. This resembles one of the advantageous characteristics of a fuse. The first and second transistors maintain, respectively, off and on states, once an overcurrent flows through the first transistor. This resembles another of the advantageous characteristics of a fuse.

Further, the breaking time of the overcurrent can freely be preset by suitably setting the time constant of the integrator. Furthermore, although the collector power dissipation of the first transistor is large when it works in its active region due to the transient current or the overcurrent, the heat caused thereby is not so high, because the first transistor does not work in the active region over the time specified by the time constant of the integrator. This allows for a high density package of various circuits.

Further, the overcurrent protection circuit of the present invention is economical from the viewpoint that the circuit can be fabricated by transistors with small collector power dissipations. This is because, in general, a transistor can tolerate a maximum collector power dissipation, under very short use, as high as 10 times or more the maximum collector power dissipation tolerable under continuous use.

Furthermore, the first transistor, provided with a capacitor between its base and emitter, has the advantage, because the capacitor absorbs a rush current, that no sparks are generated at the terminals, when the related package is plugged in, even if the circuit is being energized, and, therefore, there is no damage of the terminals by sparks and no deleterious influence to adjacent packages due to noise. This enables easy maintenance of the system, particularly when new subscriber lines and their line circuits are installed.

What is claimed is:

1. An overcurrent protection circuit, comprising:
first switching means for controlling a current flow from a power source to a load, said first switching means being operatively connected in said circuit to be in a normally conducting state and having a voltage drop thereacross within a predetermined range during normal current flow conditions;
a second switching means operatively connected to said first switching means and having an input terminal, said second switching means being normally nonconductive and responsive to a predetermined signal supplied to said input terminal thereof to be switched to a conducting state, for turning off said first switching means and thereby terminating the current flow from the power source to the load;
first delay means defining a time constant ($\tau_B$) operatively connected to said first and second switching means and responsive to a change in the voltage drop across said first switching means, indicative of an overcurrent condition, to produce an output, delayed in time in accordance with the said time constant ($\tau_B$);
means for supplying the output of said first delay means to said input of said second switching means as said predetermined signal for switching said second switching means to a conducting state; and
means for connecting said first switching means to a power source, said connecting means comprising a second delay means defining a second time constant ($\tau_S$) where ($\tau_S$) is less than ($\tau_B$), for delaying the switching of said first switching means to said normally conducting state when said overcurrent protection circuit is connected to the power source.

2. An overcurrent protection circuit as recited in claim 1, wherein:
said first switching means comprises a first transistor having emitter, base and collector terminals and said voltage drop comprises the collector-emitter voltage ($V_{CE}$) of said first transistor in a conducting state;
said second switching means comprises a second transistor having emitter, base and collector terminals;
said first delay means comprises an integrator circuit connected across said collector and emitter terminals of said first transistor; and
said second delay means comprises a second integrator circuit connected between the base and emitter terminals of said first transistor.

3. A circuit as recited in claim 2, wherein:
said first integrator comprises a first capacitor and a first resistor connected in series across the collector and emitter terminals of said first transistor, said first connecting means connecting the series connection of said first resistor and first capacitor to said base terminal of said second transistor; and
said second delay means comprises a second resistor connected between said second connecting means and said base terminal of said first transistor and a second capacitor connected between said base and emitter terminals of said second transistor.

4. A circuit as set forth in claim 3 further comprising a status detector for indicating when the overcurrent protection circuit is in feeding and breaking states.

5. A circuit as set forth in claim 4, wherein said status detector comprises a first light emitting device connected in series with the collector of said second transistor so that the first light emitting device is energized when the second transistor is conductive during the breaking state of the overcurrent protection circuit.

6. A circuit as set forth in claim 5, wherein said status detector further comprises a second light emitting device connected in series with the base of said first transistor so that the second light emitting device is energized when the first transistor is conductive during the feeding state of the overcurrent protection circuit.

7. A circuit as set forth in claim 6, wherein said status detector further comprises first and second photocouplers for monitoring the first and second light emitting diodes, respectively, and, in response thereto, generating respective first and second status indication signals.

8. A circuit as set forth in claim 5, wherein said first light emitting device comprises a light emitting diode, and said status detector further comprises a Zener diode connected in series with the base of said first transistor and in parallel with the light emitting diode.

9. A circuit as set forth in claim 8, wherein said status detector further comprises a first photocoupler for monitoring the first light emitting device and, in response thereto, generating a status indication signal.

10. A circuit as set forth in claim 5, wherein said status detector further comprising a first photocoupler for monitoring the first light emitting device and, in response thereto, generating a first status indication signal.

11. A circuit as set forth in claim 3, further incorporating a set/reset controller for selectively placing the overcurrent protection circuit in a feeding or breaking state.

12. A circuit as set forth in claim 11, wherein said set/reset controller comprises a set operation portion including a first switch for selectively removing a current supplied to the base of said second transistor to turn off said second transistor.

13. A circuit as set forth in claim 12, wherein said first switch turns on and off in response to an external signal.

14. A circuit as set forth in claim 11, wherein said set/reset controller comprises a reset operation portion including a second switch for selectively supplying a current to base of said second transistor to turn on said second transistor.

15. A circuit as set forth in claim 14, wherein said second switch turns on and off in response to an external signal.

16. A circuit as set forth in claim 11, wherein said set/reset controller comprises a set operation portion including a transfer switch for selectively supplying an additional current to the base of said first transistor.

17. A circuit as set forth in claim 16, wherein:
said set operation portion further comprises a setting resistor and a setting capacitor; and
the transfer switch, during a first switch state, selectively discharges and precharges the setting capacitor through the setting resistor and, during a second switch state, supplies a charge stored in the setting capacitor to the base of said first transistor.

18. An overcurrent protection circuit according to claim 3, further comprising means for selectively turning said first and second transistors on and off.

19. A circuit as set forth in claim 2, wherein said first integrator comprises a first capacitor and a first resistor, so that said delay time is determined by a time constant ($\tau_B$), defined by the capacitance value of the capacitor, and the resistance value of the resistor, may be set to a desired on-timing of said second transistor by varying the resistance value of the resistor.

20. A circuit as set forth in claim 19, further comprising a second capacitor, operatively connected between the base and the emitter of said first transistor, and a second resistor connected in series with the base of said first transistor, said second capacitor and said second resistor to form a second integrator having a time constant ($\tau_S$), the time constant ($\tau_S$) being selected so as to satisfy the relationship $\tau_S < \tau_B$.

21. A circuit as set forth in claim 20, wherein $\tau_S$ is substantially equal to $1/100\ \tau_B$.

22. A circuit as set forth in claim 1, wherein $\tau_S$ is substantially equal to $1/100\ \tau_B$.

23. An overcurrent protection circuit according to claim 1, further comprising status detecting means for indicating when the overcurrent protection circuit is in feeding and breaking states.

* * * * *

UNITED STATES PATENT AND TRADEMARK OFFICE
CERTIFICATE OF CORRECTION

PATENT NO. : 4,661,879

DATED : April 28, 1987

INVENTOR(S) : Sato et al.

It is certified that error appears in the above-identified patent and that said Letters Patent is hereby corrected as shown below:

Col. 3, line 9, delete "than";
       line 14, delete "of";
       line 30, delete "to (second occurrence).

Col. 6, line 47, delete the commas "," (both occurrences).

Col. 7, line 1, "Wherein" should be --wherein--.

Col. 9, line 14, "emission" should be --emitting--.

Col. 10, line 28, after "overcurrent" insert --protection--.

Signed and Sealed this

Twenty-ninth Day of December, 1987

Attest:

DONALD J. QUIGG

*Attesting Officer*  *Commissioner of Patents and Trademarks*